(12) United States Patent
Vecchiarelli et al.

(10) Patent No.: US 12,552,693 B2
(45) Date of Patent: Feb. 17, 2026

(54) DEVICES AND METHODS FOR TREATMENT OF WASTEWATER

(71) Applicant: UNIVERSITY OF SOUTH CAROLINA, Columbia, SC (US)

(72) Inventors: Paul Vecchiarelli, Lexington, SC (US); Jamie R. Lead, Columbia, SC (US)

(73) Assignee: UNIVERSITY OF SOUTH CAROLINA, Columbia, SC (US)

( * ) Notice: Subject to any disclaimer, the term of this patent is extended or adjusted under 35 U.S.C. 154(b) by 17 days.

(21) Appl. No.: 17/492,281

(22) Filed: Oct. 1, 2021

(65) Prior Publication Data

US 2022/0169543 A1 Jun. 2, 2022

Related U.S. Application Data

(60) Provisional application No. 63/120,290, filed on Dec. 2, 2020.

(51) Int. Cl.
*C02F 1/48* (2023.01)
*C02F 1/28* (2023.01)
(Continued)

(52) U.S. Cl.
CPC ............. *C02F 1/485* (2013.01); *C02F 1/285* (2013.01); *C02F 1/288* (2013.01); *C02F 1/36* (2013.01);
(Continued)

(58) Field of Classification Search
CPC ......... B82Y 99/00; B82Y 40/00; B82Y 35/00; B82Y 30/00; B82Y 25/00; C09K 2208/10; A61L 2400/12; B82B 3/0095; B82B 3/0009; B82B 3/0014; C02F 2305/08; C02F 1/48; C02F 1/725; C02F 2001/46142; C02F 9/00; C02F 1/001; C02F 2201/002; C02F 2201/00; C02F 1/006; C02F 2203/00; C02F 2203/006; C02F 1/485; C02F 1/285; C02F 1/288; C02F 1/36; C02F 1/482; C02F 2101/32; C02F 2103/008; C02F 2103/10; C02F 2103/365; C02F 2201/006; C02F 2201/48; C02F 2209/05; C02F 2209/06; C02F 2209/10; C02F 2209/11; C02F 2301/046; C02F 2303/16; C02F 2209/02;
(Continued)

(56) References Cited

U.S. PATENT DOCUMENTS 7,209,223 B1 4/2007 Hull et al.
10,071,919 B2 9/2018 Lead
(Continued)

OTHER PUBLICATIONS

Branson User Manual (Year: 2018).*

*Primary Examiner* — Magali P Slawski
*Assistant Examiner* — Bernadette Karen McGann
(74) *Attorney, Agent, or Firm* — DORITY & MANNING, P.A.

(57) ABSTRACT

Described herein is a flow-through application and system that utilizes a nanoparticle technology, which is modular and scalable, that can be utilized to recover a contaminant from water using an attendant pump and in-line sensors along with magnets and ultrasonic energy to separate magnetic nanoparticles from an aqueous mixture and to further separate recovered contaminant from contaminant-adsorbent nanoparticles. The contaminant can include an organic contaminant, such as an oil.

14 Claims, 4 Drawing Sheets

(51) Int. Cl.
  *C02F 1/36* (2023.01)
  *C02F 101/32* (2006.01)
  *C02F 103/00* (2006.01)
  *C02F 103/10* (2006.01)
  *C02F 103/36* (2006.01)

(52) U.S. Cl.
  CPC .......... *C02F 1/482* (2013.01); *C02F 2101/32* (2013.01); *C02F 2103/008* (2013.01); *C02F 2103/10* (2013.01); *C02F 2103/365* (2013.01); *C02F 2201/006* (2013.01); *C02F 2201/48* (2013.01); *C02F 2209/05* (2013.01); *C02F 2209/06* (2013.01); *C02F 2209/10* (2013.01); *C02F 2209/11* (2013.01); *C02F 2301/046* (2013.01); *C02F 2303/16* (2013.01)

(58) Field of Classification Search
  CPC .......................... C02F 1/488; C02F 2201/007; C02F 2209/40; B01J 20/28009; B01J 35/023; B01J 35/002; B01J 35/0046; B01J 35/0053; B01J 35/006; B01J 35/00; B01J 35/0006; B01J 35/0013; B01J 35/10; B01J 37/0221; B01J 23/745; B01J 23/74; B01J 20/06; B01J 20/0229; B01J 37/02; H01F 1/0054; H01F 41/16; B22F 1/06; B22F 1/05; B22F 1/054; B22F 1/07; B22F 1/16; B22F 2304/054; B22F 9/20; B22F 1/0553; B22F 2202/05; B01D 2255/00; B01D 2255/20738; B01D 2255/65; B01D 2255/40; B01D 61/18; B01D 2253/1124; C08K 2003/2272; C08K 2003/2275; C08K 2003/2268; C08K 2003/2265; C08K 3/01; C01G 49/06; C01G 49/04; C01G 49/08; C01G 49/02; C01G 49/00; C01G 1/02; Y02W 10/37
  See application file for complete search history.

(56) References Cited

U.S. PATENT DOCUMENTS

| | | | |
|---|---|---|---|
| 10,174,136 B2 | 1/2019 | Lead | |
| 2007/0103681 A1* | 5/2007 | Hull | G01N 21/645 356/318 |
| 2015/0298993 A1* | 10/2015 | Lead | B01J 20/3204 210/663 |
| 2017/0266670 A1* | 9/2017 | Stein | B01J 20/3238 |
| 2019/0345050 A1* | 11/2019 | Lead | B01J 20/223 |
| 2022/0055927 A1* | 2/2022 | Kogan | B01J 20/28009 |

* cited by examiner

DEVICES AND METHODS FOR TREATMENT OF WASTEWATER

CROSS REFERENCE TO RELATED APPLICATION

This application claims filing benefit of U.S. Provisional Patent Application Ser. No. 63/120,290, entitled "Dewatering Device For On-Site Treatment of Oily Wastewater," having a filing date of Dec. 2, 2020, which is incorporated herein by reference in its entirety.

STATEMENT REGARDING FEDERALLY SPONSORED RESEARCH

This disclosure was made with government support under Grant Numbers 1508931 and 2002629, awarded by the National Science Foundation. The government has certain rights in the invention.

BACKGROUND

Methods for removal of contaminants, e.g., organic contaminants such as oils from water include mechanical recovery (skimmers, absorbent booms), physical removal by manpower using light or heavy machinery, chemical dispersants (e.g., COREXIT™), in-situ burning of spilled oil, bioremediation, and natural attenuation of oil concentrations (i.e., allowing degradation by natural processes). Mechanical recovery approaches are the primary approach currently utilized for oil spill response in both offshore and near shore incidents. Mechanical recovery approaches are relatively easy to deploy and provide fairly consistent recovery of a portion of the spilled oil. Unfortunately, however, the labor and other costs involved are high, and these methods are limited to only partial recovery. Physical removal likewise entails very high labor costs, is limited to onshore activities, and can be extremely intrusive and even damaging to the local ecology. Chemical approaches are expensive, can impact water quality of the treated water, and often require the use of specialized equipment, while in situ burning can have a high environmental quality impact, and both of these approaches are highly dependent on local weather conditions. Bioremediation and natural attenuation are the least intrusive approaches to oil removal, but are undesirably slow, with little ability to control the process or the quality of the outcome.

While some spill clean-up technologies are approved by regulators for all spills, not all technologies are actually effective for all scenarios. This, as well as other shortcomings such as those mentioned above, present major gaps in spill response and highlights the need to develop new technologies that are broadly applicable, as well as effective, for removal of contaminants from aqueous systems.

What are needed in the art are effective contaminant separation systems and methods that may be used in conjunction with or independent from other separation methods.

SUMMARY

According to one embodiment, disclosed is a flow-through system as may be utilized to separate a contaminant from an aqueous mixture. A system can include an inlet through which an aqueous mixture can be accepted. The aqueous mixture can include water mixed with a contaminant. A system can also include a plurality of nanoparticles that each include a magnetic material (e.g., as a component of a core) and a polymeric material at a surface of each of the nanoparticles. The polymeric material can be configured to preferentially adsorb the contaminant from the mixture. The system can include a mixing chamber within which the plurality of nanoparticles can be combined with the aqueous mixture. Upon the combination, the contaminant of the mixture can adsorb to the polymeric material of the nanoparticles. In addition, the system can include a magnetic material that can attract the nanoparticles and be configured to remove the nanoparticles from the mixture following adsorption of the contaminant to the particles, providing a clean aqueous product. A system can also include an ultrasound emitter configured to emit ultrasonic energy and release contaminant that has been adsorbed from the nanoparticles. Beneficially, the system can be a modular system and various components of the system, e.g., mixing chamber, magnet, ultrasound emitter, etc. can be removably attached to the system for a period of time during which that component carries out a portion of an overall process and then later separated from the system. A modular system can also provide for ease of locating the system at an area for water treatment, e.g., clean-up at a spill site, or the like.

Also disclosed are methods for separating a contaminant from an aqueous mixture. In one particular embodiment, a contaminant can include an oil. A method can include combining the aqueous mixture with a plurality of nanoparticles, upon which a contaminant of the aqueous mixture can be adsorbed to the nanoparticles forming a plurality of coated nanoparticles. A method can also include passing the combination past a magnetic material and thereby concentrating the coated nanoparticles together in an area and forming a clean aqueous product. A method can also include subjecting the coated nanoparticles to ultrasonic energy thereby removing the contaminant from the nanoparticles and regenerating the nanoparticles, for instance for further use in a recycle stream and/or for further use of the separated contaminant.

BRIEF DESCRIPTION OF THE DRAWINGS

An understanding of the features and advantages of the present disclosure will be obtained by reference to the following detailed description that sets forth illustrative embodiments, in which the principles of the disclosure may be utilized, and the accompanying drawings of which.

Figure 1:
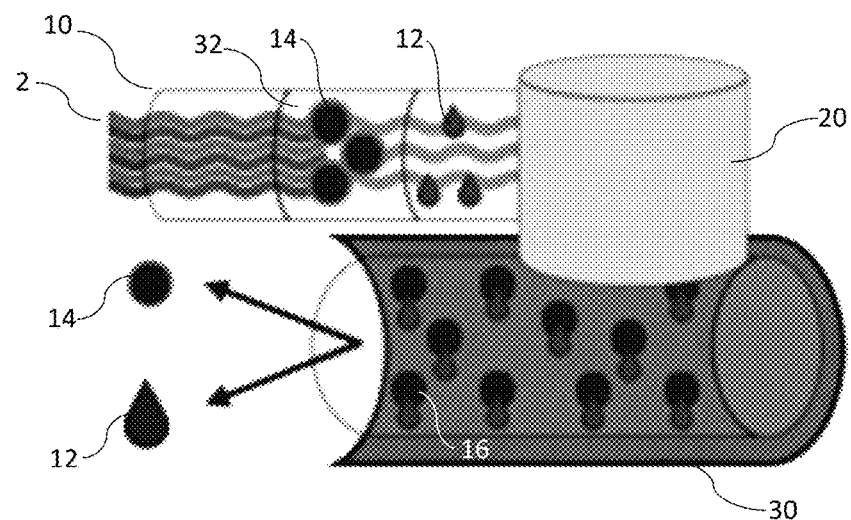
FIG. 1 schematically illustrates one embodiment of a system as disclosed herein.

The figures herein are for illustrative purposes only and are not necessarily drawn to scale. Repeat use of reference characters in the present specification and drawings is intended to represent the same or analogous features or elements of the present invention.

DETAILED DESCRIPTION

Reference will now be made in detail to various embodiments of the disclosed subject matter, one or more examples of which are set forth below. Each embodiment is provided by way of explanation of the subject matter, not limitation thereof. In fact, it will be apparent to those skilled in the art that various modifications and variations may be made in the present disclosure without departing from the scope or spirit of the subject matter. For instance, features illustrated or described as part of one embodiment, may be used in another embodiment to yield a still further embodiment.

In one embodiment, disclosed herein are systems and methods for reclamation of contaminated water. Disclosed approaches utilize particles that can adsorb contaminants, e.g., organic contaminants, contained in an aqueous mixture followed by magnetic-based separation of the particles from the water to provide a clean aqueous product. Following magnetic separation, the particles can be processed to separate the contaminant, the contaminant can be collected, and the particles can be recycled for reuse. A system can treat contaminated water from any source, including, without limitation, water storage tanks or treatment facilities, fresh water or seafaring vessels, environmental spills, contaminated soil/sediments and slurries thereof, etc. In some embodiments, disclosed systems and methods can be utilized in decontaminating wastewater at point sources. However, other applications are envisaged for various organic pollutants and diverse clean-up scenarios.

Disclosed systems can be effective for treatment of contaminated waste in clean-up applications as well as on-going water treatment applications. For instance, disclosed systems can be utilized for offshore, near-shore, as well as onshore water remediation including for clean-up in sensitive ecosystems such as coastlines, wetlands, and marshes, including marine as well as estuary waters or fresh waters, as the methods include no discharge of hazardous compounds utilized in the clean-up into the local environment. The ease of deployment and mitigation of environmental risk provided by disclosed systems when utilized in an ex-situ (e.g., clean-up) approach can be highly beneficial both during use and in obtaining permission for use by local and federal stakeholders.

Beneficially, disclosed systems can incorporate control systems suitable for use for remote monitoring and process automation, which can enable ongoing remediation as well as low environmental impact to local areas when used in applications in remote areas. For instance, a control system can include local and/or remote displays that can provide information regarding contaminant level in intake streams, remaining clean-up materials for use, content of produced clean water, amount of contaminant removed, etc. Moreover, the systems can be modular as well as easily scalable, and as such, can be quickly and easily deployed for use in disaster situations (e.g., oil spills, weather disasters, etc.) for treatment of either small quantities of waste in a short-term application or large quantities of waste over a longer period of treatment.

Contaminated water as may be treated by use of disclosed methods and systems can include water contaminated by oil spills (e.g., oil tanker spills and the like) as well as that contaminated by oil from other sources. For instance, tank farm leaks (e.g., diesel storage in remote areas) are known as a contributor to long-term oil pollution, as well as leaks due to pipeline infrastructure including both pipeline and terminal leaks, and oil well maintenance, for instance for declining oil wells. However, it should be understood that disclosed methods and systems are not limited to removal of fossil fuel-based hydrocarbons (e.g., petroleum) from water, and other types of contaminants can likewise be removed from a contaminated water source. For instance, disclosed methods and systems can be useful in treatment of produced water (i.e., wastewater produced in an industrial process) as well as other industrial effluent, removal of disinfection byproducts present following a water treatment or other treatment or cleaning process, treatment of water effluent from agricultural processing, treatment of bilge water or other onboard water treatment in ocean-going vessels, treatment of sewer and storm water overflows, or any other source that can include a contaminant.

In one embodiment, the methods and systems can be utilized for separation of an organic contaminant from an aqueous mixture. By way of example, a system can be utilized for separation of an organic contaminant such as an oil from an aqueous mixture. As utilized herein, the term "oil" is generally intended to refer to an organic contaminant derived from a plant, animal, or mineral source that is generally a viscous liquid at ambient temperatures, generally nonpolar, and exhibits hydrophobic and lipophilic characteristics including, without limitation, crude oil, refined oil, fossil-based fuels (diesel, gasoline, kerosene, jet fuel, etc.). However, disclosed systems are not limited to processes that separate an oil from an aqueous mixture and can be beneficially utilized in separation of other types of contaminants, including other organic contaminants such as fats, waxes, etc. that may be solid at ambient temperature.

As illustrated in FIG. 1, a system can include several different components that can be provided as a single structure or alternatively, as modular components that can be connected to one another for easier transportation and sizing to fit a location and treatment protocol. As indicated, a system can include an intake 10 that can accept an aqueous stream 2 to be treated.

As mentioned above, the aqueous stream to be treated can be provided from any source, e.g., fresh water, salt water, brackish water, waste treatment, environmental clean-up site, etc. In general, an aqueous stream 2 can be in the form of a multiphasic liquid including at least one aqueous phase and at least one organic phase. Beneficially, the systems can function effectively under a wide array of environmental conditions including, and without limitation to, high salinity conditions (e.g., seawater salinity), the presence of natural organic macromolecules such as humic substances, wide temperature variation, etc.

By way of example and without limitation, an aqueous stream 2, as may be treated according to the present disclosure, can have a pH ranging from acidic to basic, e.g., from about pH 3 to about pH 13, from about pH 6 to about pH 9, or from about pH 7 to about pH 9, in some embodiments. An aqueous stream 2 can have a high salinity in some embodiments, for instance about 5,000 mg/L or higher in some embodiments, such as from about 5,000 mg/L to about 170,000 mg/L, such as from about 10,000 mg/L to about 150,000 mg/L, such as from about 20,000 mg/L to about 100,000 mg/L, though, as mentioned, disclosed systems can likewise be utilized in processing a contaminated freshwater stream with little or no salinity.

The aqueous stream 2 can include one or more contaminants 12 in addition to other components, that can be either naturally present in the aqueous stream (e.g., natural salts), other contaminants that can be removed according to additional downstream processing, etc. For instance, an aqueous stream 2 can include natural organic matter (NOM) in addition to one or more contaminants that are targeted by the disclosed systems/methods. For instance, an aqueous stream 2 can include NOM in a concentration of from about 0.1 mg/L to about 10 mg/L in some embodiments, such as from about 1 mg/L to about 8 mg/L, or from about 2 mg/L to about 6 mg/L. In some embodiments, an aqueous stream can include suspended solids, for instance in a concentration of from about 1 mg/L to about 1,000 mg/L, from about 100 mg/L to about 800 mg/L, or from about 200 mg/L to about 600 mg/L in some embodiments.

Optionally, a system can be utilized in conjunction with a traditional water treatment approach, either prior to or following removal of a contaminant as described. In such an embodiment, a secondary treatment protocol can modify the content of the treated aqueous stream 2, for instance through removal of solids, NOM, pH modification, etc.

Disclosed methods and systems are applicable to treatment of an aqueous stream having a contaminant concentration at any level, and while being particularly relevant to environmental spills, are not limited to such. For example, an aqueous stream 2 can include one or more contaminants 12 in a concentration of about 40 mg/L or greater, such as from about 40 mg/L to about 2,000 mg/L, such as from about 50 mg/L to about 1,500 mg/L, such as from about 100 mg/L to about 1,000 mg/L in some embodiments.

In one embodiment, the aqueous stream 2 can include a crude oil or a refined product thereof, e.g., a fuel, an industrially relevant organic hydrocarbon, a heavy hydrocarbon, etc. as an oily contaminant 12. Crude oil refers to a mixture of compounds that can be categorized into four fractions: (1) saturates (or alkanes); (2) aromatics, including for example benzene, toluene, ethylbenzene and xylenes, and polyaromatic hydrocarbons (PAHs); (3) resins, which are compounds containing nitrogen, sulfur, and oxygen, that are dissolved in oil; and (4) asphaltenes, which are large and complex molecules that are colloidally dispersed in the oil. The relative proportions of these fractions in the crude oil are dependent on many factors, including for example source, age, and migration.

Figure 2:
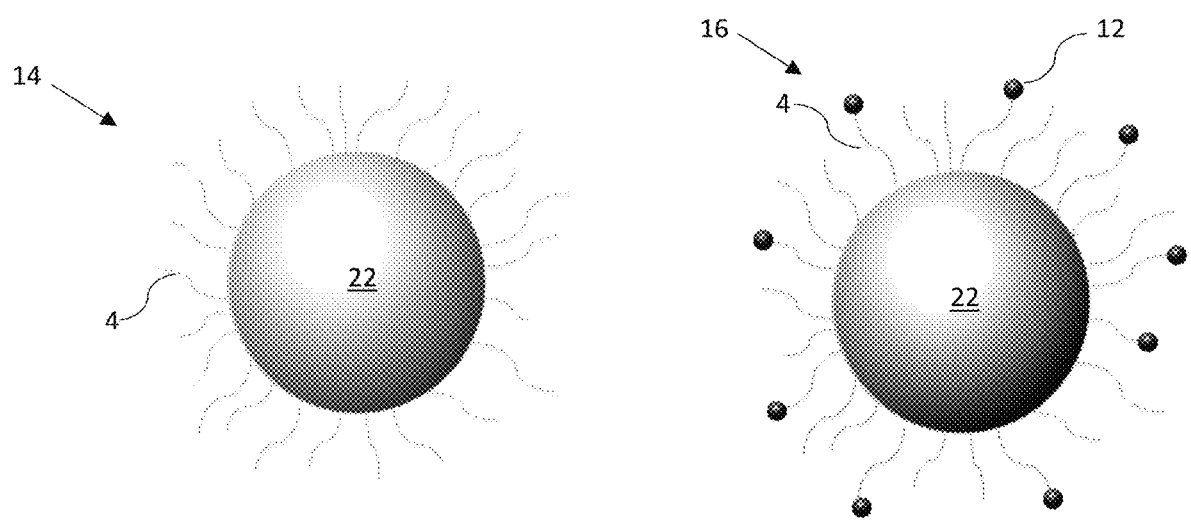
FIG. 2 schematically illustrates one embodiment of a nanoparticle as may be utilized in disclosed methods and systems.

As indicated in FIG. 1, a system can include a plurality of particles 14 that can be combined with the aqueous stream 2. FIG. 2 (left) illustrates a representative particle 14 that can include a magnetic core 22 and a plurality of polymers 4 at a surface of the core 22. Beneficially, the particulate separation materials used can be those that are generally resistant to dynamic changes in the environment due to, for example, oxidation, sulfidation, aggregation, eco-corona formation, etc.

The magnetic core 22 can include a magnetic material as either a sole material or in conjunction with a non-magnetic material. For instance, a magnetic core 22 can include one or more ferromagnetic materials, including but not limited to iron, nickel, cobalt, or combinations thereof, as well as oxides thereof. In one embodiment, the magnetic core 22 can include an iron-based material, such as an iron oxide. In embodiments, an iron oxide nanoparticle core 22 can include $Fe^{3+}$ and/or $Fe^{2+}$. For instance, a magnetic core 22 can include a combination of $Fe^{3+}$ and $Fe^{2+}$, and the molar ratio can be between about 3:1 and about 1:1 $Fe^{3+}$ to $Fe^{2+}$, such as about 2:1 $Fe^{3+}$ to $Fe^{2+}$ in some embodiments. For example, suitable iron oxides as may be included in a magnetic core 22 can include iron(II) oxide (FeO), iron(II,III) oxide ($Fe_3O_4$ or $Fe_4O_5$), iron(III) oxide ($Fe_2O_3$), etc. In one embodiment, a magnetic core 22 can be formed primarily of magnetite ($Fe_3O_4$) and/or its oxidized form maghemite ($\gamma$-$Fe_2O_3$). Such iron oxide cores can exhibit superparamagnetic properties (a.k.a., SPIONs) that can be particularly suitable for certain embodiments.

A magnetic core 22 including a magnetic metal oxide can be formed according to any suitable method. In one embodiment, a magnetic core 22 can be formed according to a process that includes reacting a metal salt with an oxygen source within a reaction chamber. Exemplary formation methods have been described in U.S. Pat. No. 10,174,136 to Lead and U.S. Pat. No. 10,071,919 to Lead, which are incorporated herein by reference. For instance, a metal salt can be reacted with an oxygen source (e.g., ammonium hydroxide). Metal salts which can be used in forming a magnetic core 22 can include, but are not limited to, iron-, nickel- or cobalt-based salts or combinations thereof. Suitable iron salts include, but are not limited to, iron(II) sulfate, iron(II) nitrate, iron(II) chloride, iron(II) perchlorate, iron (III) sulfate, iron(III) nitrate, iron(III) chloride, iron(III) perchlorate, and mixtures thereof.

In conjunction with a magnetic core 22, a particle 14 can include a polymeric material 4 at the surface of the core, for instance as a shell that completely or partially surrounds the magnetic core 22. In one particular embodiment, the polymeric material 4 can form a polymeric shell around the core 22 having a thickness of about 1 nm to about 50 nm. In some embodiments, the polymeric material can partially cover a surface of the core 22, for instance covering about 10% or more of the entire surface of the core 22, about 20% or more, about 25% or more or about 50% or more, such as from about 10% to about 90%, from about 20% to about 80%. The polymeric material 4 may be chemically bonded to the core 22, and/or may be mechanically bonded to the core 22, depending on the interaction between the particular polymeric material 4 utilized and the particular material of the magnetic core 22.

A polymer 4 of the particle 14 can be capable of adsorbing a contaminant 12 present in an aqueous stream 10 and provide a contaminant-coated particle 16 as illustrated in FIG. 2 (right). In one embodiment, the particle 14 can include a polyvinylpyrrolidone (PVP)-based polymer 4, either alone or in a polymeric matrix with another polymer. For example, a polymer having aliphatic and aromatic structures similar to hydrocarbons can be combined with a PVP-based polymer 4 on a surface of a particle 14. For example, a PVP-based polymer 4 can be at least 50% by weight of the polymeric material of a polymeric shell, such as about 75% to 100% by weight. In one embodiment, the PVP-based polymer can be at least 90% by weight of the polymeric material of a polymeric shell, such as about 95% to 100% by weight. The PVP-based polymer can be polyvinylpyrrolidone (PVP) or a polyvinylpyrrolidone derivative having the core backbone based on the PVP polymeric structure.

The PVP-based polymers can have, in particular embodiments, a molecular mass of about 10 kDa to about 360 kDa, with the lower end of the range being most effective for adsorption of the targeted contaminant (e.g., about 10 kDa to about 200 kDa).

While a particle 14 can be formed according to any suitable methodology, in one embodiment, a particle 14 can be formed in a single-step co-precipitation process in which a polymeric material 4 and a metal salt can be supplied together to a reaction chamber in a carrying fluid, and an oxygen source for reaction with the metal salt can be supplied separately into the reaction chamber (e.g., as a gas). By way of example, in one embodiment, Fe(II) and Fe(III) chlorides can be mixed with PVP at a reaction temperature of about 90° C. The pH of the resulting mixture can then be raised using a suitable oxygen source, e.g., ammonium and/or sodium hydroxide, which causes precipitation and particle growth. Beneficially, a synthesis can be aqueous based with utilization of no organic solvents in some embodiments. Subsequent to synthesis, purification can be carried out prior to utilization in a separation protocol, for instance using a simple water wash process.

Particle size and size dispersity can be controlled by the chemical and physical properties of the reaction. For instance, a particle 14 for use in disclosed methods can generally have a diameter on the nanometer scale, e.g., about 200 nm or less, such as from about 1 nm to about 100 nm.

Referring again to FIG. 1, an aqueous stream 2 can be combined with a plurality of the magnetic nanoparticles 14 subsequent to intake 10 of the aqueous stream 2. While the particular concentration of the particles 14 combined with the aqueous stream can vary, for instance based upon flow rate through the system, expected concentration of contaminant, etc., in some embodiments, the nanoparticles 14 can be combined with the aqueous stream 2 at a concentration of from about 0.1 mg/L to about 200 mg/L, for instance, from about 1 mg/L to about 100 mg/L, or from about 10 mg/L to about 50 mg/L in some embodiments.

A system can include one or more components that can be utilized to move an aqueous stream 2 through a system, combine the aqueous stream 2 with the nanoparticles 14, as well as provide control and sensing capabilities. For instance, a system can include at least one pump 20 that can move an aqueous stream 2 through an intake 10 and into a mixing chamber 32 where the aqueous stream 2 can be mixed and combined with a plurality of the nanoparticles 14.

As indicated in FIG. 1, a mixing chamber 32 can be simply a length of a flow line through which the aqueous stream 2 can be pumped, so as to cause intimate mixing between the aqueous stream 2 and the nanoparticles 14, which can be combined with the aqueous stream 2 at any convenient point along the flow. In another embodiment, illustrated in FIG. 3, a mixing chamber 32 can include a more defined module of a system, for instance a section of a system between first and second sensors 24, that can be utilized in monitoring and controlling a process. In this embodiment, a pump 20 can be utilized to cause an aqueous stream 2 to flow into a system via an intake 10 and to the mixing chamber 32. Within the mixing chamber 32, the aqueous stream 2 can be combined with nanoparticles 14, for instance as may be provided by use of a cartridge 34 that can inject an amount of the nanoparticles 14 into the mixing chamber 32 by use of a control system in coordination with the output of a first sensor 24.

Figure 3:
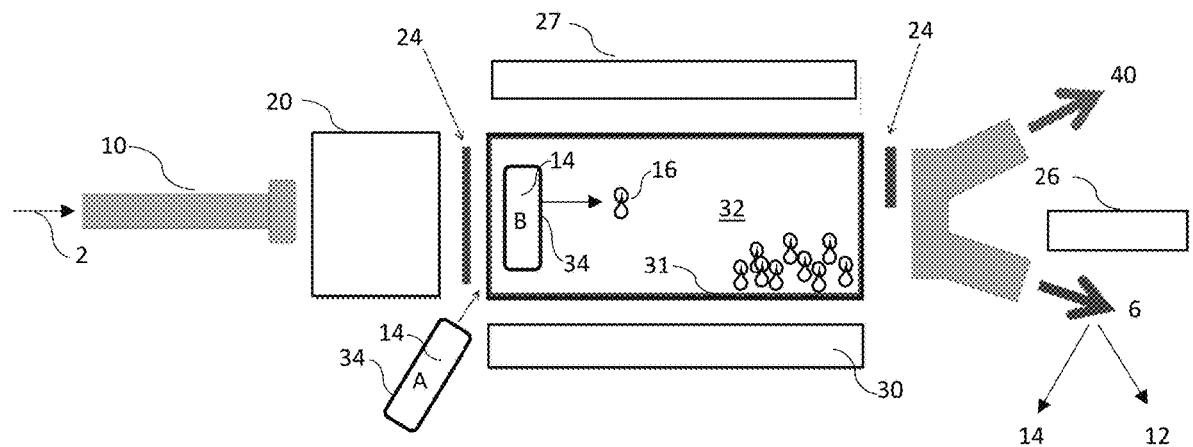
FIG. 3 schematically illustrates one embodiment of a mixing/separation chamber as may be included in a system.

Alternatively, a cartridge 34 can include a plurality of nanoparticles 14 and the entire cartridge 34 can be movable, and upon entry of an aqueous stream 2 into the mixing chamber 32 can be moved as indicated by the arrow from position A to position B in FIG. 3 and thus moved into the flow path of the aqueous stream 2. Flow through the cartridge 34 can provide intimate contact between the aqueous stream 2 and the nanoparticles 14 encouraging adsorption of the contaminant 12 to the nanoparticles 14. In some embodiments, the nanoparticles 14 held within the cartridge can be released from the cartridge 34 and into the mixing chamber 32 in conjunction with the aqueous stream 2. In other embodiments, the nanoparticles 14 can be retained within the cartridge, and following a period of contact, the cartridge 34, which now contains coated nanoparticles 16, can be removed from the chamber 32 and replaced with a new cartridge 34.

Sensors 24 at either side of a mixing chamber 32 can be utilized to determine real-time characteristics of an aqueous flow 2 passing into and out of a mixing chamber including, without limitation, iron presence and/or concentration, turbidity, absorbance, fluorescence, etc. so as to control various aspects of a process. For instance, an input sensor can be utilized to determine contaminant concentration within the mixing chamber and control release and concentration of nanoparticles 14 for combination with the aqueous stream 2 within the chamber. Sensors 24 can be utilized to determine iron presence in a stream passing into or out of a mixing chamber, so as to prevent release of iron-containing nanoparticles with a clean aqueous stream 40 and confirm flow of iron-containing nanoparticles in a regeneration stream. Exemplary sensors as may be utilized in disclosed systems include flow-through optical sensors, such as those described in U.S. Pat. No. 7,209,223 to Hull et al., which is incorporated herein by reference. Online micro-fluidics-based calorimetry sensing systems may be utilized in some embodiments for providing real-time monitoring of both input and outflow streams to/from a mixing chamber 32.

Whether in a continuous format within a flowline or through a mixing chamber, or in a batch or semi-batch format within a mixing chamber, nanoparticles 14 and a contaminant 12 of the aqueous stream can contact one another, upon which contaminant 12 can be adsorbed to polymer 4 of the particles 14 to form coated nanoparticles 16 that include the magnetic core 22, the polymer 4, and contaminant 12 adsorbed to the polymer. Depending upon specific materials and characteristics of a system, upon contact between nanoparticles 14 and an aqueous stream 2 including contaminant 12, polymer-coated nanoparticles 14 can adsorb contaminant 12 in an amount of from about 10 to about 50 times the mass of the nanoparticles within about 40 minutes to about 60 minutes of contact. As such, the nanoparticles can adsorb nearly 100% of a contaminant 12, for instance, about 95% or more, or about 99% or more of a contaminant 12 upon intimate contact between a contaminated aqueous stream 2 and nanoparticles 14.

Following a period of contact time, either as the mixture of the aqueous stream 2 and the nanoparticles 14 are pumped through a system as in FIG. 1 or held within a mixing chamber 32 as in FIG. 3, the coated nanoparticles 16 can be separated from the mixture. In one embodiment, the coated nanoparticles 16 can be separated from the mixture by use of a magnet 30.

Magnet 30 can include a permanent magnet or an electromagnet, as desired. In addition, a magnet 30 can be external to the system, e.g., external to a mixing chamber 32 or within the system, e.g., within a flow line or mixing chamber such that the aqueous mixture contacts the magnet.

FIG. 1 and FIG. 3 illustrate embodiments in which a magnet 30 can be located external to a flow line or a mixing chamber. In such an embodiment, when the coated nanoparticles 16 enter a suitably strong magnetic field by turning on an electromagnet 30 and/or upon approach of the coated nanoparticles 16 to the magnet 30, the nanoparticles can be attracted to an inner surface 31 of the mixing chamber 32 thereby separating the clean aqueous flow 40 from the coated nanoparticles 16. As the flow exits the mixing chamber 32, the separated phases of the contents (i.e., the nanoparticle-containing phase and the clean phase) can be diverted to separate flow lines, as indicated, providing a clean aqueous flow 40 and a contaminated flow 6 that carries the coated nanoparticles 16. As indicated previously, one or more sensors 24 can be utilized to determine content of each flow and confirm that the clean aqueous flow 40 has been adequately treated to remove the contaminant 12 and to be adequately separated from the nanoparticles 14.

In an alternative embodiment, the coated nanoparticles 16 can be retained at a surface of the mixing chamber 32 by the magnetic field as the clean aqueous flow 40 exits the chamber 32. Following exit of the clean aqueous flow 40 from the mixing chamber 32, the coated nanoparticles 16 can be released from the magnetic field and then flushed from the mixing chamber 32 as a contaminated flow 6.

Figure 4:
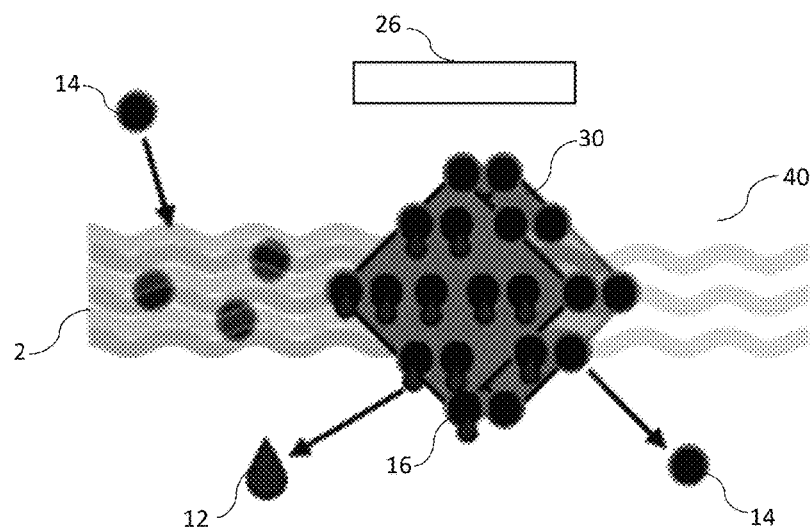
FIG. 4 schematically illustrates one embodiment of a nanoparticle separation scheme as may be incorporated in a system.

FIG. 4 illustrates another embodiment of a separation scheme that can be utilized to separate coated nanoparticles 16 from an aqueous stream 2. In this embodiment, a magnet 30 can be located within the fluid, for instance in the form of a magnetic support within a flow field or within a mixing chamber. As the water/nanoparticle mixture contacts the magnet 30, the coated nanoparticles 16 can adhere to the magnet 30, leaving a clean aqueous stream 40 for removal from the system.

In those embodiments in which the coated nanoparticles 16 are directly adhered to a magnet 30, the coated nanoparticles 16 can be manually scraped or brushed from the magnet 30. In other embodiments in which the nanoparticles are held at a surface of a system by use of an external magnet, a magnet 30 can be moved, e.g., separated or rotated, or otherwise modified, e.g., turned off, to decrease the magnetic field strength that is retaining coated nanoparticles 16, and thereby allowing for the coated nanoparticles 16 to be released. For instance, in the case of an electromagnet 30, the current can be shut off, thereby stopping the magnetic field and freeing the coated nanoparticles 16. In other embodiments, for instance in the case of an external magnet 30 as illustrated in FIG. 1 and FIG. 3, that can be either an electromagnet or a permanent magnet, the external magnet 30 can be physically separated from the mixing chamber and/or the external magnet can be rotated to modify the magnetic field, thereby freeing the coated nanoparticles 16 retained within the mixing chamber 32. Following, the released coated nanoparticles 16 can be collected, e.g., a mixing chamber 32 can be flushed with a washing fluid that can remove the coated nanoparticles 16 as a contaminated stream 6.

Beneficially, disclosed systems and methods can include regeneration of the nanoparticles 14 by separation of the contaminant 12 from the nanoparticles. In one embodiment, subjection of the coated nanoparticles 16 to ultrasonic energy can be utilized to separate the contaminant from the nanoparticles. For instance, in the embodiment disclosed in FIG. 3, following exit from the mixing chamber 32, a contaminated flow 6 can be subjected to an ultrasonic field generated by an ultrasound emitter 26 that can separate the contaminant 12 from the nanoparticles 14 and allow separate collection of each.

Alternatively, the coated nanoparticles 16 can be subjected to ultrasonic energy while still within the mixing chamber 32. For instance, a system can include an ultrasound emitter 27 that can be either a modular component of a system intended for periodic use at a mixing chamber 32, or a permanent component of a mixing chamber unit that is configured to emit sonic energy to the interior of the mixing chamber 32. In a modular embodiment, an ultrasound emitter 27 can be located in sonic communication with the mixing chamber 32 in conjunction with the magnet 30 (i.e., both are held near the mixing chamber at the same time). Alternatively, following release of the clean aqueous flow 40 from the mixing chamber 32, the magnet 30 can be replaced with the ultrasound emitter 27.

An ultrasound emitter 27 can emit sonic energy into the mixing chamber 32, which can cause the contaminant 12 to be released from the nanoparticles 14. The two materials can then be flushed separately from the mixing chamber. In some embodiments, the regenerated nanoparticles 14 can be held within the mixing chamber 32 by use of the magnet 30 while the contaminant 12 is flushed from the mixing chamber 32. Following, the magnet 30 can be moved or otherwise altered to release the regenerated nanoparticles 14 from the magnetic field, and the regenerated nanoparticles 14 can then be flushed from the mixing chamber 32 and collected.

In a system as illustrated in FIG. 4, in which the magnet 30 is internal to the mixing chamber, following adherence of the coated nanoparticles 16 to magnetic supports 30, and removal of clean aqueous stream 40, an ultrasound emitter 26 can be utilized to generate an ultrasonic field, causing the contaminant 12 to separate from the nanoparticles 14. The contaminant 12 can then be collected from the system separately from the regenerated nanoparticles 14. For instance, the contaminant 12 can be flushed from the system. The magnet 30 can then be removed from the system and the regenerated nanoparticles physically removed from the magnet 30. Alternatively, the magnetic field can be altered, freeing the regenerated nanoparticles 14 for separate collection.

The power of ultrasonic energy to which the coated nanoparticles are subjected can be about 3 Watts or greater, for instance about 4 Watts or greater, or about 5 Watts or greater, such as from about 10 Watts to about 80 Watts or from about 15 Watts to about 40 Watts. An ultrasound emitter 26, 27 can have its own power source (e.g., solar, battery, etc.) or can utilize an external power source, as desired.

The frequency of the ultrasonic energy is not particularly limited and can be about 20,000 Hz (the base frequency for ultrasonic energy) to about 170,000 Hz. In one embodiment, coated nanoparticles 16 can be sonicated at a frequency of about 35,000 Hz or greater, such as at a frequency of about 40,000 Hz.

Figure 5:
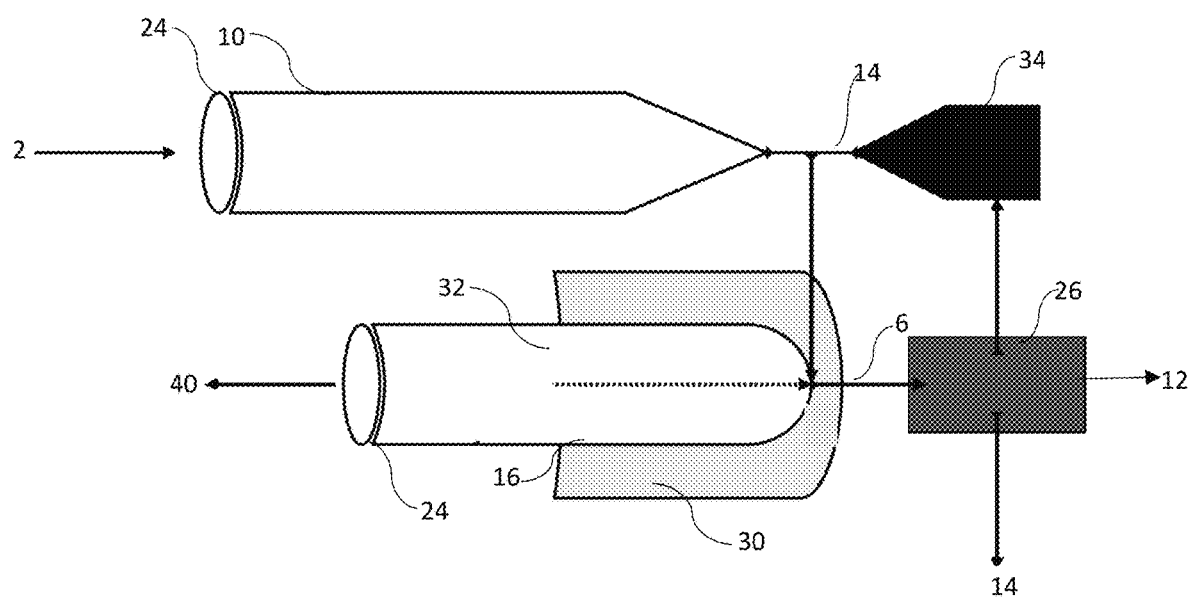
FIG. 5 schematically illustrates another embodiment of a system as disclosed herein.

FIG. 5 illustrates another embodiment of a system according to the present disclosure. As indicated, an aqueous stream 2 can be taken into a system via an intake 10 under the control of a pump or the like. At or near the intake 10 can be one or more sensors 24 that can be utilized in conjunction with a control system to inject nanoparticles 14 from a nanoparticle cartridge 34 for combination with the aqueous stream 2. For instance, an input sensor 24 can provide information regarding contaminant content of an aqueous stream 2, flow rate of the aqueous stream 2, presence/content of other contaminants in an aqueous stream, pH, temperature, etc. of the stream 2, and the like.

The combined stream can be pumped to a mixing chamber 32 within which intimate contact between the nanoparticles 14 and the aqueous stream 2 can encourage adsorption of a contaminant to the polymer of the nanoparticles. Following a suitable contact time, a magnet 30 can be utilized to separate the coated nanoparticles 16 from the clean aqueous stream 40, for instance in an adhered layer of coated nanoparticles 16 at an interior surface of the mixing chamber 32, and the clean aqueous stream 40 can exit the system.

In some embodiments, a system can include one or more sensors 24 at or near an exit for the clean aqueous stream that can provide further information for control of a system, e.g., contaminant content in the clean aqueous stream 40, presence of iron or another material of the nanoparticles in the clean aqueous stream, flow rate, remaining nanoparticle content of cartridge 34, amount of produced clean water, amount of contaminant removed from the input stream 2, etc.

Following or in conjunction with removal of the clean aqueous stream 40 from the mixing chamber, a contaminated flow 6 can be removed from the mixing chamber and subjected to ultrasonic energy by use of an ultrasound emitter 26, upon which contaminant 12 can be collected and the regenerated nanoparticles 14 can also be collected be for further use. Alternatively, and as discussed previously, ultrasonic energy can be directed at the coated nanoparticles 16 while retained in the mixing chamber 32 and the regenerated nanoparticles 14 and the contaminant 12 can be collected separately.

Figure 6:
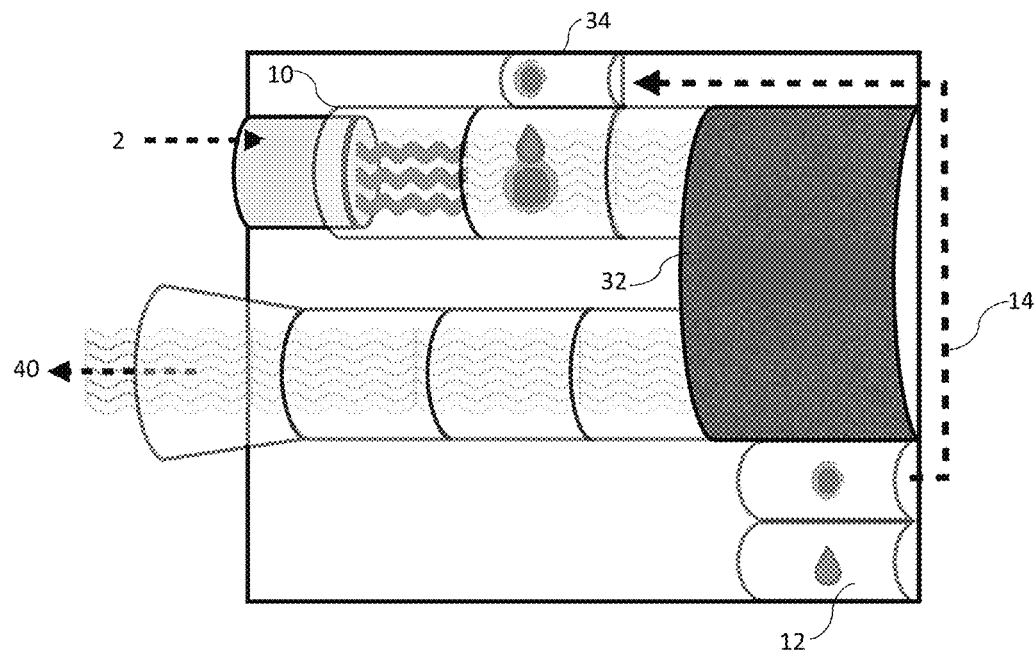
FIG. 6 schematically illustrates another embodiment of a system as disclosed herein.

FIG. 6 illustrates another embodiment of a system as may be particularly beneficial for use in an ocean-going or other watercraft. As with other systems, the system can include an inlet 10 to connect onto an aqueous source, e.g., bilge water of the vessel. The aqueous stream at the inlet 2 can be monitored to determine contaminant concentration and the rate/concentration of injection of nanoparticles 14 from a nanoparticle cartridge 34 desirable for treatment of the aqueous stream in the mixing chamber 32. The nanoparticles 14 are combined with the aqueous stream and together pass while being mixed through the mixing chamber 32, which can include a magnetic casing at which the resulting coated nanoparticles are removed from the liquid and clean aqueous flow 40 can be discharged. As in other embodiments, the inflow and outflow can be monitored by added online sensors.

A regeneration process can be used to recover both the nanoparticles 14 and the contaminant 12 for reuse. For instance, the nanoparticles 14 can be recycled to the nanoparticle cartridge 34 for reuse. The regeneration process can be carried out within the mixing chamber 32 or downstream thereof, as desired, and can separate the contaminant 12 from the nanoparticles 14 by use of sonic energy.

As with other embodiments, a system can include one or more sensors that can be located both upstream and downstream of a mixing chamber 32 (though sensor location is by no means limited to any particular locations). Sensors can provide for automatic or manual control of a system as well as real time information regarding contaminant removal quantities and characteristics of the clean aqueous stream 40, which may be suitable for discharge directly into the environment in some embodiments.

Figure 7:
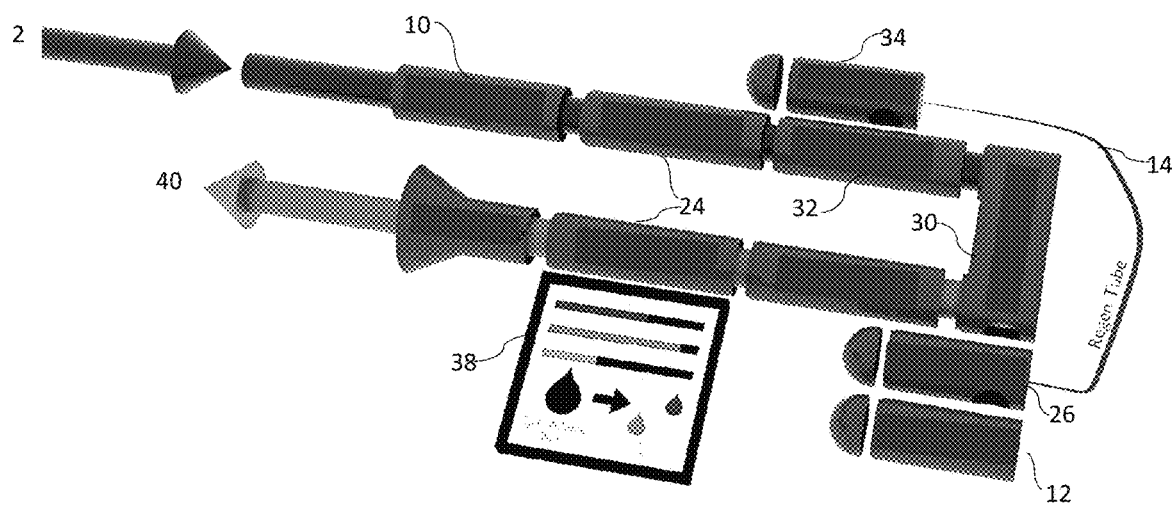
FIG. 7 schematically illustrates another embodiment of a system as disclosed herein.

FIG. 7 illustrates another embodiment of a system in which the various components are illustrated to emphasize the optional modularity of a system. As indicated an aqueous stream 2 can flow into a system via an inlet 10 and be combined with nanoparticles 14 (including regenerated and recycled nanoparticles 14) via a nanoparticle cartridge 34. Following combination and contact within a mixing chamber 32, a magnet 30 can be utilized to separate a clean aqueous stream 40 from the coated nanoparticles, which can then be further separated by use of ultrasonic energy emitted from an ultrasound emitter 26.

In some embodiments, a system can include a dashboard 38 that can be in communication with various sensors 24 and control elements (e.g., pumps, etc.) that can provide information with regard to inflow and outflow characteristics, nanoparticle concentrations, ultrasonic energy controls, magnetic field controls, etc.

Beneficially, both the separated contaminants and the clean water produced by disclosed methods can also provide benefit. For instance, in some embodiments, the separated contaminant can be useful in agricultural applications, for instance in the form of a biosolid or liquid carbon source, or can be useful as a fuel, which can help reduce the environmental footprint of disclosed technologies. Moreover, the clean aqueous product of a treatment protocol can be utilized in other applications, for instance in agricultural applications for irrigation, can be released back into the natural environment, or can be further treated to provide potable water.

Although the disclosure has been described in connection with specific embodiments, it will be understood that discussed embodiments are capable of further modifications and that the invention as claimed should not be unduly limited to such specific embodiments. Indeed, various modifications of the described modes for carrying out the disclosure that are obvious to those skilled in the art are intended to be within the scope of the disclosure. This application is intended to cover any variations, uses, or adaptations of the disclosure following, in general, the principles of the disclosure and including such departures from the present disclosure come within known customary practice within the art to which the disclosure pertains and may be applied to the essential features set forth herein.

What is claimed is:

1. A system for separating a contaminant from water, the system comprising:
   a mixing chamber comprising a first inlet and a second inlet, the first inlet being configured for receiving a first aqueous mixture comprising a contaminant, wherein the contaminant comprises an oil from the first aqueous mixture;
   a first sensor configured to detect the contaminant concentration or presence in the first aqueous mixture and the first sensor determines a fluorescence of the first aqueous mixture;
   a nanoparticle cartridge containing a plurality of nanoparticles, each nanoparticle comprising a core that includes a magnetic material and a polymeric material at a surface of the core, wherein the polymeric material covers from about 10% to about 90% the surface of the core, the polymeric material comprising a polyvinylpyrrolidone, wherein the second inlet of the mixing chamber is configured to receive the plurality of nanoparticles via an outlet of the nanoparticle cartridge and thence into the mixing chamber and thereby form a second mixture within the mixing chamber, the second mixture comprising the first aqueous mixture and the plurality of nanoparticles;
   a control system configured to retain the second mixture within the mixing chamber for a period of time during which the first aqueous mixture and the plurality of nanoparticles are mixed and combined;
   a pump under the control of the control system and configured to pump the second mixture out of the mixing chamber following the period of time;
   a flow line configured for receiving the second mixture, wherein the flow line is removably attached to the system;
   a magnet external to the flow line and configured for magnetic communication with an inner surface of the flow line and collection of at least a portion of the plurality of nanoparticles on the inner surface of the flow line;
   the outlet configured for releasing a clean aqueous stream from the flow line;
   and a second sensor configured to detect the contaminant concentration or presence in the clean aqueous stream.

2. The system of claim 1, wherein the first sensor and the second sensor are flow-through optical sensors.

3. The system of claim 1, the nanoparticles comprising iron, nickel, cobalt, or a combination thereof.

4. The system of claim 3, the nanoparticles comprising an iron oxide.

5. The system of claim 4, the iron oxide comprising $Fe^{3+}$ and/or $Fe^{2+}$.

6. The system of claim 1, wherein the magnet comprises a permanent magnet.

7. The system of claim 1, further comprising a recycle line configured for recycling nanoparticles within the system.

8. The system of claim 1, wherein the magnet comprises an electromagnet.

9. The system of claim 1, further comprising an ultrasound emitter.

10. The system of claim 1, wherein the control system is configured to control movement of the plurality of nanoparticles out of the nanoparticle cartridge and then into the mixing chamber.

11. The system of claim 10, wherein the first sensor is in communication with the control system to control an amount of the nanoparticles moved into the mixing chamber from the nanoparticle cartridge.

12. The system of claim 1, further comprising one or more additional sensors, the one or more additional sensor(s) configured to provide information regarding flow rate, pH, or temperature of the first aqueous mixture, the second mixture, or the clean aqueous mixture.

13. The system of claim 1, wherein the second sensor determines the fluorescence of the clean aqueous stream.

14. The system of claim 9, wherein the ultrasound emitter is configured to emit ultrasonic energy into the mixing chamber.

* * * * *